US012711465B2

(12) United States Patent
Shah et al.

(10) Patent No.: US 12,711,465 B2
(45) Date of Patent: Aug. 18, 2026

(54) SECURITY GATEWAY THAT PERFORMS CLAWBACK OF EMAIL MESSAGES

(71) Applicant: Sophos Limited, Abingdon Oxfordshire (GB)

(72) Inventors: Siddharth Harishbhai Shah, Ahmedadabad (IN); Neelkumar Navinchandra Makadiya, Ahmedabad (IN); Vishal Parshottambhai Vala, Ahmedabad (GB)

(73) Assignee: Sophos Limited, Abingdon (GB)

( * ) Notice: Subject to any disclaimer, the term of this patent is extended or adjusted under 35 U.S.C. 154(b) by 19 days.

(21) Appl. No.: 18/916,520

(22) Filed: Oct. 15, 2024

(65) Prior Publication Data

US 2026/0037926 A1 Feb. 5, 2026

(51) Int. Cl.
*G06Q 10/107* (2023.01)
*H04L 9/40* (2022.01)

(52) U.S. Cl.
CPC ....... *G06Q 10/107* (2013.01); *H04L 63/1416* (2013.01); *H04L 63/02* (2013.01); *H04L 63/14* (2013.01)

(58) Field of Classification Search
CPC ... G06Q 10/107; H04L 63/1416; H04L 63/02; H04L 63/14
See application file for complete search history.

(56) References Cited

U.S. PATENT DOCUMENTS

| | | | | |
|---|---|---|---|---|
| 2016/0261549 | A1* | 9/2016 | Freed | H04L 51/18 |
| 2018/0176256 | A1* | 6/2018 | Lin | H04L 51/42 |
| 2026/0019438 | A1* | 1/2026 | Pickman | H04L 63/1425 |

OTHER PUBLICATIONS

"About Threat Explorer and Real-time detections in Microsoft Defender for Office 365", https://web.archive.org/web/20240612202600/https://learn.microsoft.com/en-us/defender-office-365/threat-explorer-real-time-detections-about, Apr. 24, 2024.
"Communication from the Examiner in GB Application No. 2512580.8", Dec. 1, 2025.
"Microsoft Defender for Office 365 documentation", https://web.archive.org/web/20240616210444/https://learn.microsoft.com/en-us/defender-office-365; retrieved Feb. 20, 2026.

* cited by examiner

*Primary Examiner* — Tonia L Dollinger
*Assistant Examiner* — Joseph M Cousins
(74) *Attorney, Agent, or Firm* — IP Spring

(57) ABSTRACT

A security application determines that a user authorized recall of one or more email messages. The security application determines that one or more domains associated with one or more recipients of the one or more emails are enrolled with a security server. The security application receives a user request from the user to recall the one or more email messages that were delivered to the one or more recipients. The security application provides a command to an email server of the one or more domains to move the one or more email messages to a hidden directory that is inaccessible to the one or more recipients. The security application determines a respective status for the one or more email messages based on a response or a nonresponse from the email server. The security application provides a summary report to the user.

20 Claims, 9 Drawing Sheets

100
Policy Management 112
Definitions 114
Updates 120
Analytics 168
Dynamic Policies 170
Marketplace Interface 174
Marketplace Provider 199
Security Management 122
Network Access 124
Remedial Actions 128
Event Logging 166
Asset Classification 160
Identity Management 172
Identity Provider 158
Detection Techniques 130
Event Collection 164
Entity Models 162
SAAS Application 156
Application Protection 150
Threat Management Facility 101
S
Cloud Computing Instance 109
Network 154
Wireless Access Point 11
Firewall 10
Server 20
Endpoint 12
Mobile Device 16
Security Application 103
Server 14
IoT Device 18
Cloud Computing Instance 19
Enterprise Facility 102
Mobile Device 26
Endpoint 22
Security Application 103
NOTE: S = Security Agent

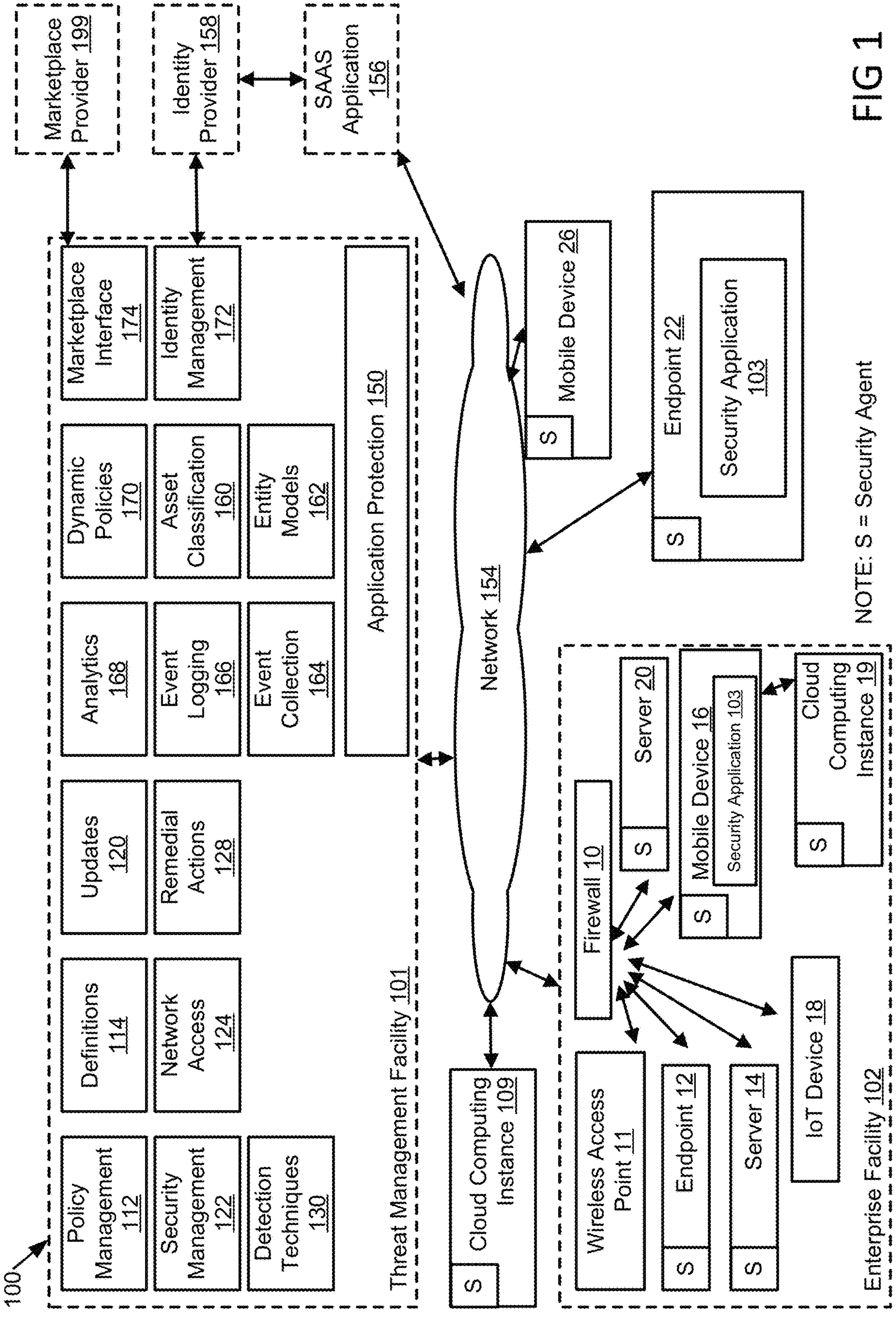

Email Security – Domains Settings/Status 505

Configure External Dependencies 535

Configure Post Delivery 540

Add Domain 545

Domains (2)

| Name 510 | Inbound Destination 515 | Outbound Origin 520 | Post-Delivery 525 |
| --- | --- | --- | --- |
| Snd-qa-us-adv-1.com | sndqausadv1-com.mail.protection.... | MS Office 365 | Connected |
| Snd-qa-us-adv-2.com | sndqausadv2-com.mail.protection.... | Custom Gateway | Not connected 630 |

600

Email Protection – Candidate Emails for Clawback 605

Initiate Clawback 620

615

| | Sender 607 | Subject 609 | Reason 611 |
| --- | --- | --- | --- |
| ☑ | Transaction-alert@... | Hello dear – are you looking for loan | spam |
| ☐ | Sarah.J803@... | Arranging hotel | prohibited content |
| ☐ | Jon.Doe@hotm… | Checkout this video! | compromised account |
| ☐ | Sam.Smith@so… | Changes to contract | authorization revoked |

Determine that a user authorized recall of the one or more email messages 902

Determine that one or more domains associated with the one or more recipients of the one or more email messages are enrolled with a security server 906

Responsive to determining that the user authorized recall of the one or more email messages and that the one or more domains are enrolled with the security server, receive a user request from a user to recall the one or more email messages that were delivered to one or more recipients, the user request specifying one or more respective message identifiers for the one or more email messages 906

Provide a command to an email server of the one or more domains to move the one or more email messages to a hidden directory that is inaccessible to the one or more recipients, where the instructions include the one or more respective message identifiers of the one or more email messages 908

Determine a respective status for the one or more email messages based on a response or a nonresponse from the email server, where the respective status is one of: clawback successful, clawback failed, or clawback initiated 908

Responsive to determining the respective status, provide a summary report to the user that indicates the respective status of the one or more email messages 910

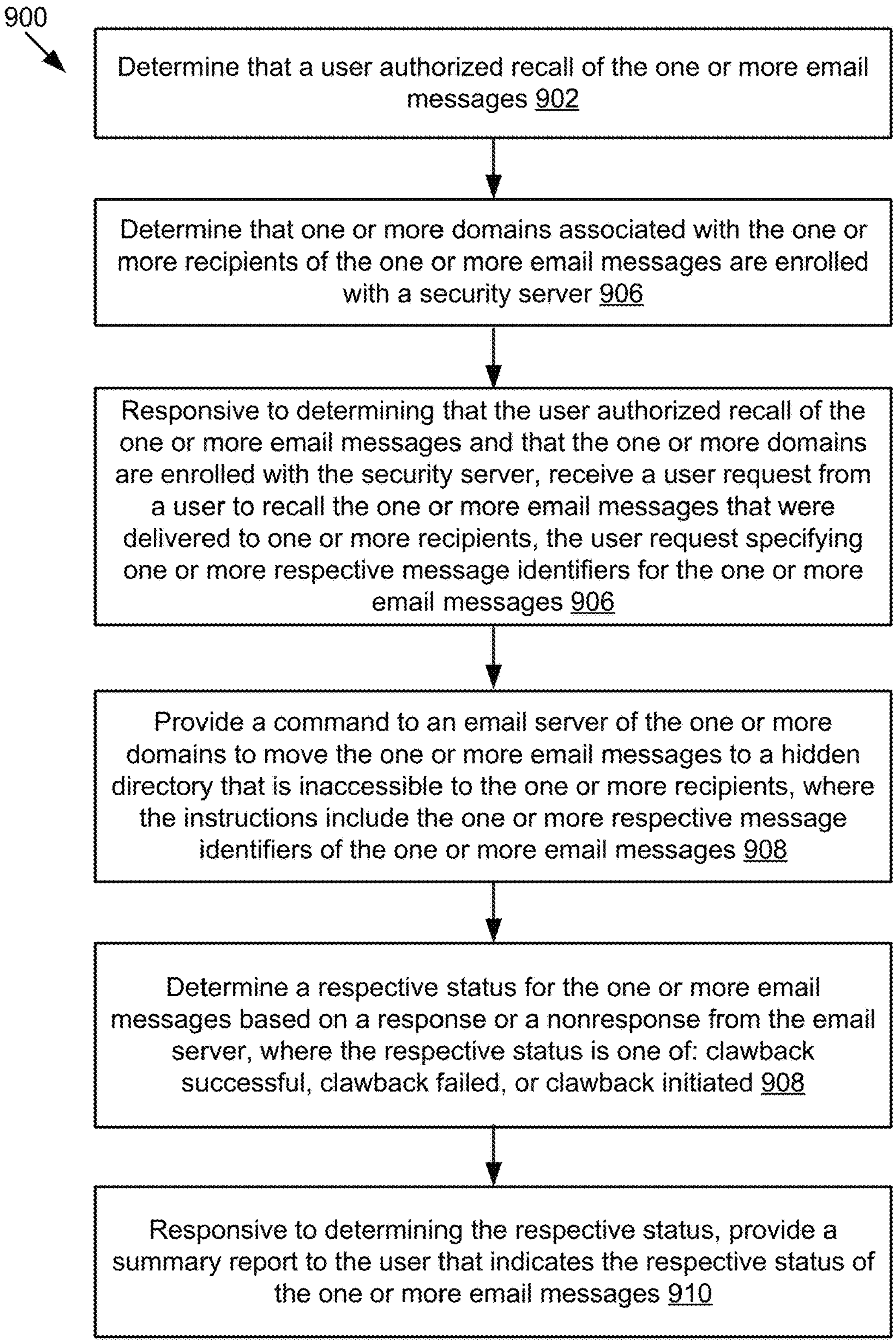

FIG 9

SECURITY GATEWAY THAT PERFORMS CLAWBACK OF EMAIL MESSAGES

FIELD

Embodiments relate generally to performing clawback of email messages. More particularly, embodiments relate to methods, systems, and computer-readable media that hide delivered email messages from a recipient's mailbox.

BACKGROUND

Email servers deliver email messages to users. Circumstances may arise where an administrator (or an automated process) wants to recall an email message from the user's mailbox. For example, a user may send an email to the wrong recipient, an email may include malicious content, an email may include content that violates policy, etc.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes determining that a user authorized recall of one or more email messages. The method further includes determining that one or more domains associated with one or more recipients of the one or more emails are enrolled with a security server. The method further includes responsive to determining that the user authorized recall of the one or more email messages and that the one or more domains are enrolled with the security server, receiving a user request from the user to recall the one or more email messages that were delivered to the one or more recipients, the user request specifying one or more respective message identifiers for the one or more email messages. The method further includes providing a command to an email server of the one or more domains to move the one or more email messages to a hidden directory that is inaccessible to the one or more recipients, wherein the command includes the one or more respective message identifiers of the one or more email messages. The method further includes determining a respective status for the one or more email messages based on a response or a nonresponse from the email server, wherein the respective status is one of: clawback successful, clawback failed, or clawback initiated. The method further includes responsive to determining the respective status, providing a summary report to the user that indicates the respective status of the one or more email messages.

In some embodiments, the method further includes prior to providing the command to the email server to move the one or more email messages, querying a message history database for one or more email messages that match a search request based on one or more search criteria; and responsive to querying the message history database, receiving the one or more respective message identifiers that correspond to one or more email messages that match the one or more search criteria in the search request. In some embodiments, the method further includes prior to receiving the user request from the user to recall the one or more email messages, determining that the one or more email messages that were delivered to the one or more recipients include suspicious content; and responsive to determining that the one or more email messages include suspicious content, providing a suggestion to the user to initiate recall of the one or more email messages. In some embodiments, wherein determining that the one or more email messages include suspicious content is based on at least one determination selected from a group comprising: a sender of the one or more email messages is associated with a compromised account, the sender of the one or more email messages is associated with a suspicious domain, the sender of the one or more email messages is associated with a suspicious Internet Protocol (IP) address, the one or more email messages are part of a phishing attack, the one or more email messages contain malware, the one or more email messages include a suspicious attachment, the one or more email messages include a Uniform Resource Locator (URL) associated with suspicious content, the one or more email messages are spam, and combinations thereof.

In some embodiments, the method further includes receiving a policy that defines one or more items selected from a group of Personally Identifiable Information (PII), sensitive information, confidential information, prohibited content, and combinations thereof; prior to receiving the request from the user to recall the one or more email messages, determining that the one or more email messages that were delivered to the one or more recipients violate the policy; and responsive to determining that the one or more email messages violate the policy, providing a suggestion to the user to initiate recall of the one or more email messages. In some embodiments, the method further includes prior to receiving the user request from the user to recall the one or more email messages: providing a user interface that includes a search function that enables searching email messages received at the email server of the one or more domains based on one or more options selected from a group of a sender, a recipient, a keyword, a Uniform Resource Locator, a name of an attachment, and the one or more email messages that include an executable, and combinations thereof; performing the search based on user input received via the user interface, wherein the user input specifies respective field values for the one or more fields, to identify the one or more email messages that were delivered to the one or more recipients; and providing an updated user interface to the user that enables the user to initiate recall of the one or more email messages. In some embodiments, the search includes a list of recipients of the one or more email messages to recall the message from, wherein the list of recipients excludes at least one of the one or more recipients. In some embodiments, the method further includes prior to receiving the user request from the user to recall the one or more email messages: determining that the one or more recipients are no longer authorized to view content in the one or more email messages; and responsive to determining that the one or more recipients are no longer authorized to view the content in the one or more email messages, providing a suggestion to the user to recall the one or more email messages.

In some embodiments, the one or more email messages are associated with a plurality of recipients and the method further includes prior to receiving the request from the user to recall the one or more email messages, receiving a notification from at least one of the plurality of recipients that the one or more email messages contain suspicious content; and responsive to receiving the notification from at least one of the plurality of recipients, providing a suggestion to the user to recall the one or more email messages. In some embodiments, the method further includes sending a modification command to the email server to modify the one or more email messages by performing an action selected from a group of adding a warning banner, removing an attachment from the one or more email messages, rewriting the one or more email messages to modify an original Uniform Resource Locator (URL) to point to a URL protection service, and combinations thereof. In some embodiments, the method further includes adding the one or more email messages to a quarantine folder; responsive to receiving a release request, releasing the one or more email messages from the quarantine folder; and updating the respective status of the one or more messages to clawback release.

A system comprises one or more processors and one or more computer-readable media, having instructions stored thereon that, when executed by the one or more processors, cause the one or more processors to perform operations. The operations include determining that a user authorized recall of one or more email messages; determining that one or more domains associated with one or more recipients of the one or more emails are enrolled with a security server; responsive to determining that the user authorized recall of the one or more email messages and that the one or more domains are enrolled with the security server, receiving a user request from the user to recall the one or more email messages that were delivered to the one or more recipients, the user request specifying one or more respective message identifiers for the one or more email messages; providing a command to an email server of the one or more domains to move the one or more email messages to a hidden directory that is inaccessible to the one or more recipients, wherein the command includes the one or more respective message identifiers of the one or more email messages; determining a respective status for the one or more email messages based on a response or a nonresponse from the email server, wherein the respective status is one of: clawback successful, clawback failed, or clawback initiated; and responsive to determining the respective status, providing a summary report to the user that indicates the respective status of the one or more email messages.

In some embodiments, the operations further includes prior to providing the command to the email server to move the one or more email messages, querying a message history database for the one or more email messages that match a search request based on one or more search criteria; and responsive to querying the message history database, receiving the one or more respective message identifiers that correspond to one or more email messages that match the one or more search criteria in the search request. In some embodiments, the operations further include prior to receiving the user request from the user to recall the one or more email messages, determining that the one or more email messages that were delivered to the one or more recipients include suspicious content; and responsive to determining that the one or more email messages include suspicious content, providing a suggestion to the user to initiate recall of the one or more email messages. In some embodiments, determining that the one or more email messages include suspicious content is based on at least one determination selected from a group comprising: a sender of the one or more email messages is associated with a compromised account, the sender of the one or more email messages is associated with a suspicious domain, the sender of the one or more email messages is associated with a suspicious IP address, the one or more email messages are part of a phishing attack, the one or more email messages contain malware, the one or more email messages include a suspicious attachment, the one or more email messages include a URL associated with suspicious content, the one or more email messages are spam, and combinations thereof.

A non-transitory computer-readable medium with instructions stored thereon that, responsive to execution by a processing device, causes the processing device to perform operations. The operations include determining that a user authorized recall of one or more email messages; determining that one or more domains associated with one or more recipients of the one or more emails are enrolled with a security server; responsive to determining that the user authorized recall of the one or more email messages and that the one or more domains are enrolled with the security server, receiving a user request from the user to recall the one or more email messages that were delivered to the one or more recipients, the user request specifying one or more respective message identifiers for the one or more email messages; providing a command to an email server of the one or more domains to move the one or more email messages to a hidden directory that is inaccessible to the one or more recipients, wherein the command includes the one or more respective message identifiers of the one or more email messages; determining a respective status for the one or more email messages based on a response or a nonresponse from the email server, wherein the respective status is one of: clawback successful, clawback failed, or clawback initiated; and responsive to determining the respective status, providing a summary report to the user that indicates the respective status of the one or more email messages.

In some embodiments, the operations further include prior to providing the command to the email server to move the one or more email messages, querying a message history database for the one or more email messages that match a search request based on one or more search criteria; and responsive to querying the message history database, receiving the one or more respective message identifiers that correspond to one or more email messages that match the one or more search criteria in the search request. In some embodiments, the operations further include prior to receiving the user request from the user to recall the one or more email messages, determining that the one or more email messages that were delivered to the one or more recipients include suspicious content; and responsive to determining that the one or more email messages include suspicious content, providing a suggestion to the user to initiate recall of the one or more email messages. In some embodiments, determining that the one or more email messages include suspicious content is based on at least one determination selected from a group comprising: a sender of the one or more email messages is associated with a compromised account, the sender of the one or more email messages is associated with a suspicious domain, the sender of the one or more email messages is associated with a suspicious IP address, the one or more email messages are part of a phishing attack, the one or more email messages contain malware, the one or more email messages include a suspicious attachment, the one or more email messages include a URL associated with suspicious content, the one or more email messages are spam, and combinations thereof. In some embodiments, the operations further include receiving a policy that defines one or more items selected from a group of PII, sensitive information, confidential information, prohibited content, and combinations thereof; prior to receiving the request from the user to recall the one or more email messages, determining that the one or more email messages that were delivered to the one or more recipients violate the policy; and responsive to determining that the one or more email messages violate the policy, providing a suggestion to the user to initiate recall of the one or more email messages.

BRIEF DESCRIPTION OF THE DRAWINGS

FIG. 1 depicts a block diagram of an example threat management system, according to some embodiments described herein.

FIG. 9 is a flow diagram of an example method to recall an email message, according to some embodiments described herein.

DETAILED DESCRIPTION

Figure 2:
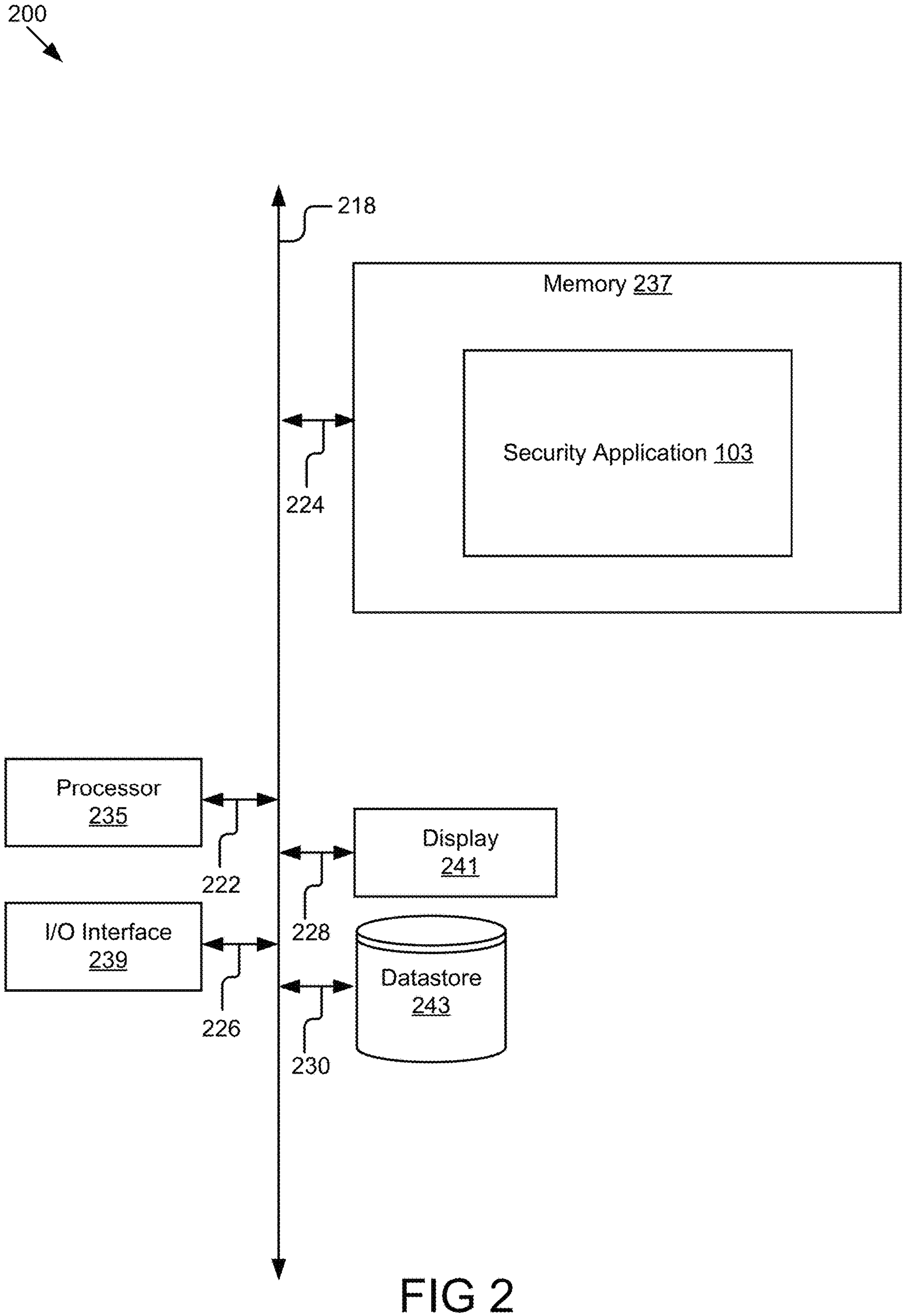
FIG. 2 is a block diagram of an example computing device, according to some embodiments described herein.

Email servers deliver email messages to users. When an administrator tries to recall an email message from the user's mailbox, current technology causes too many delays. In addition, the process is arduous: an administrator generates search criteria, requests a report, and cannot request to delete an email message until after the report is generated.

The technology described below advantageously solves the problems of delays in the recall of email messages by employing a security application that, responsive to confirming user eligibility, provides a user interface with an option for a user to recall one or more email messages that were delivered to one or more recipients in a single request. For example, the user request may be to recall an email message that was sent to a large number of recipients (e.g., 800) or multiple email messages that were sent to multiple users. The user request includes respective message identifiers for the one or more email messages.

In addition, because the security application is part of a security gateway, the security application could initially deliver an email with a warning banner, but then an administrator could override the decision and clawback the email message using the security gateway.

The security application provides a command to an email server of the one or more domains to move the one or more email messages to a hidden directory that is inaccessible to the one or more recipients where the command includes the one or more respective message identifiers. The email server provides a response or does not respond, which indicates a respective status for the one or more email messages. The respective status includes clawback successful for a successful attempt to hide the one or more email messages, clawback initiated for an ongoing attempt where the email server has not yet responded, and clawback fails for an unsuccessful attempt where the email server has not responded after multiple attempts to send the command. The security application provides a summary report to the user that indicates the respective status of the one or more email messages.

In some embodiments, before the user requests that the one or more email messages be recalled, the security application identifies situations when the user may want to recall the one or more messages. For example, the security application receives an update to a policy and determines that the one or more email messages include suspicious content when the one or more email messages were previously determined to be safe because the policy definitions are updated in real time. In another example, the security application determines that the one or more email messages include suspicious content, the security application receives an update to a policy that identifies the one or more email messages as including personally identifiable content or other types of prohibited content, or a recipient is no longer authorized to view content in the one or more email messages. The security application provides a suggestion to the user to recall the one or more email messages.

As a result, the security application advantageously recalls email messages efficiently, has the capability to recall a large number of email messages or an email sent to a large numbers of recipients, and identifies situations to reduce the risk of compromising computers with suspicious content that are contained in email messages.

Threat Management System

FIG. 1 depicts a block diagram of a threat management system 100 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 100. A number of capabilities may be provided by the threat management facility 101, with an overall goal to intelligently monitor network traffic from endpoints/hosts to known security product update sites. The threat management facility 101 can monitor the traffic passively and analyze the traffic. The threat management facility 101 may be or may include a gateway such as a web security appliance that is actively routing and/or assessing the network requests for security purposes. Another overall goal is to provide protection needed by an organization that is dynamic and able to adapt to changes in compute instances and new threats due to personal or unmanaged devices using the enterprise network. According to various aspects, the threat management facility 101 may provide protection from a variety of threats to a variety of compute instances in a variety of locations and network configurations.

As one example, users of the threat management facility 101 may define and enforce policies that control access to and use of compute instances, networks, and data. Administrators may update policies such as by designating authorized users and conditions for use and access. The threat management facility 101 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 101 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises, such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 101 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 101 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 101. The marketplace provider may communicate with the threat management facility 101 via the marketplace interface facility 174 to provide additional functionality or capabilities to the threat management facility 101 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 101 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth. In some implementations, the endpoint 22 and/or the mobile device 26 include a security application 103 that is discussed in greater detail below.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 101 may be provided as a stand-alone solution. In other implementations, aspects of the threat management facility 101 may be integrated into a third-party product. An application programming interface (e.g., a source code interface) may be provided such that aspects of the threat management facility 101 may be integrated into or used by or with other applications. For instance, the threat management facility 101 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 101 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, uniform resource identifier (URI) filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections, while also allowing for monitoring as described herein. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 101 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious internet protocol (IP) addresses, code authors, code signers, or domains, that when detected may invoke an action by the threat management facility 101. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 101. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

According to some implementations, network traffic associated with the update facility functions may be monitored to determine that personal devices and/or unmanaged devices are appropriately applying security updates. In this manner, even unmanaged devices may be monitored to determine that appropriate security patches, software patches, virus definitions, and other similar code portions are appropriately updated on the unmanaged devices.

The threat management facility 101 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 101, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 101 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of uniform serial bus (USB) disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 101, or, for example, by a hosted system. In some implementations, the threat management facility 101 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 101 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 101 and the compute instances 10-26 may be provided with new definitions periodically to include most recent threats. Updating of definitions may be managed by the update facility 120 and may be performed upon request from one of the compute instances 10-26, upon a push, or some combination. Updates may be performed at a specific a time period, on demand from a device 10-26, upon determination of an important new definition or a number of definitions, and so on.

A threat research facility (not shown) may provide a continuously ongoing effort to maintain the threat protection capabilities of the threat management facility 101 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 101 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 101 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that are accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator from an IT department, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Computing Device

FIG. 2 is a block diagram of an example computing device 200 that may be used to implement one or more features described herein. Computing device 200 can be any suitable computer system, server, or other electronic or hardware device. In some embodiments, computing device 200 is part of the enterprise facility 102 in FIG. 1. For example, the computing device may be the mobile device 16, the server 13, the server 20, etc. In some embodiments, the computing device 200 is the endpoint 22 illustrated in FIG. 1.

In some embodiments, computing device 200 includes a processor 235, a memory 237, an input/output (I/O) interface 239, a display 241, and a datastore 243, all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, and the datastore 243 may be coupled to the bus 218 via signal line 230.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 may be a computer-readable media that stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the security application 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or datastore 243), and input/output devices can communicate via I/O interface 239. In another example, the I/O interface 239 can receive data, such as email messages, from a user device 115 and deliver the data to the security application 103. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.).

Some examples of interfaced devices that can connect to I/O interface 239 can include a display 241 that can be used to display content, e.g., an email message received from the sender. The display 241 can include any suitable display device such as a liquid crystal display (LCD), light emitting diode (LED), or plasma display screen, cathode ray tube (CRT), television, monitor, touchscreen, three-dimensional display screen, or other visual display device.

The datastore 243 may store data related to the security application 103. For example, the datastore 243 may store, with user permission, email messages, message identifiers, metadata corresponding to the email messages, etc. The datastore 243 may be coupled to the bus 218 via signal line 230.

In some embodiments, one or more components of the computing device 200 may not be present depending on the type of computing device 200. For example, if the computing device 200 is a server, the computing device 200 may not include the display 241.

FIG. 2 illustrates a computing device 200 that executes an example security application 103 stored in memory 237 of the computing device 200. The security application 103 determines that a user authorized recall of one or more email messages and one or more domains associated with the one or more recipients are enrolled with a security server. Responsive to determining that the user authorized recall of the one or more email messages and that the one or more domains are enrolled with the security server, the security application 103 receives a user request from the user to recall the one or more email messages that were delivered to the one or more recipients, the user request specifying one or more respective message identifiers for the one or more email messages.

The security application 103 provides a command to an email server of the one or more domains to move the one or more email messages to a hidden directory that is inaccessible to the one or more recipients, where the command includes the one or more respective message identifiers of the one or more email messages. The security application 103 receives a response or a nonresponse from the email server, the response indicating a respective status for the one or more email messages, where the status is one of: clawback successful, clawback failed, clawback initiated, or clawback release. Responsive to determining the respective status, the security application 103 provides a summary report to the user that indicates the respective status of the one or more email messages.

Email System

Figure 3:
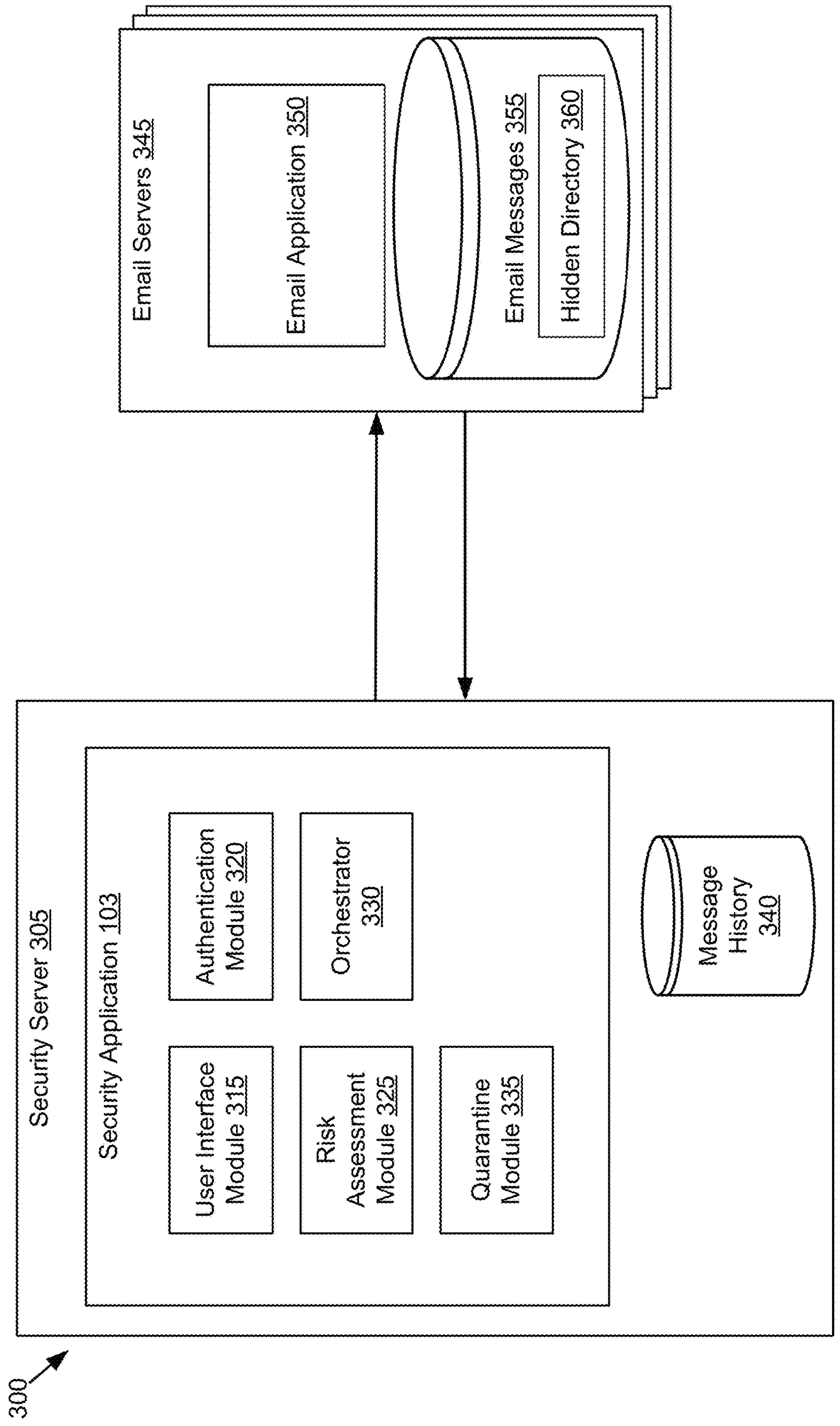
FIG. 3 is a block diagram of an example security system that includes a security server and one or more email servers, according to some embodiments described herein.

FIG. 3 is a block diagram of an email system 300 that includes a security server 305 and one or more email servers 345, according to some embodiments. The security server 305 includes a security application 103 and a message history datastore 340. The one or more email servers 345 each include an email application 350, and an email messages datastore 355. The different emails servers 345 may correspond to different email services, such as those provided by Microsoft®, Google®, Yahoo®, etc. as well as email servers for a particular entity (e.g., a business organization, government organization, etc.).

The security application 103 is a security gateway that receives email messages before the email messages are received by one or more email servers 345. In some embodiments, the security application 103 coordinates with scanners (not shown) that scan the email messages to identify whether one or more of the email messages include suspicious content (e.g., malware, links to malware, prohibited content, policy violating content, etc.). The security application 103 provides email messages to the email servers 345, which uses the email application 350 to deliver email messages to recipients. The email server 345 is enrolled with a security service provider that operates the security server 305 and thereby, security server 305 can access various features of email servers 345 to perform operations with regards to individual email messages. Such access may be facilitated via an application programming interface (API) provided by the email application 350 of the email servers 345.

In this example, the security application 103 includes a user interface module 315, an authentication module 320, a risk assessment module 325, an orchestrator 330, and a quarantine module 335. In some embodiments, the security application 103 includes additional modules or fewer modules.

The user interface module 315 generates graphical data for displaying user interfaces, such as the user interfaces illustrated in FIGS. 4-8. The user interfaces include options for post-delivery protection, suggests email messages to be recalled, information about connected domains, options for different parameters that are used to identify email messages to be recalled, a summary report, etc. The user interface module 315 may generate additional user interfaces, such as additional user preferences, options for sending recalled email messages to quarantine, options for modifying email messages and then resending the email messages, etc.

Figure 4:
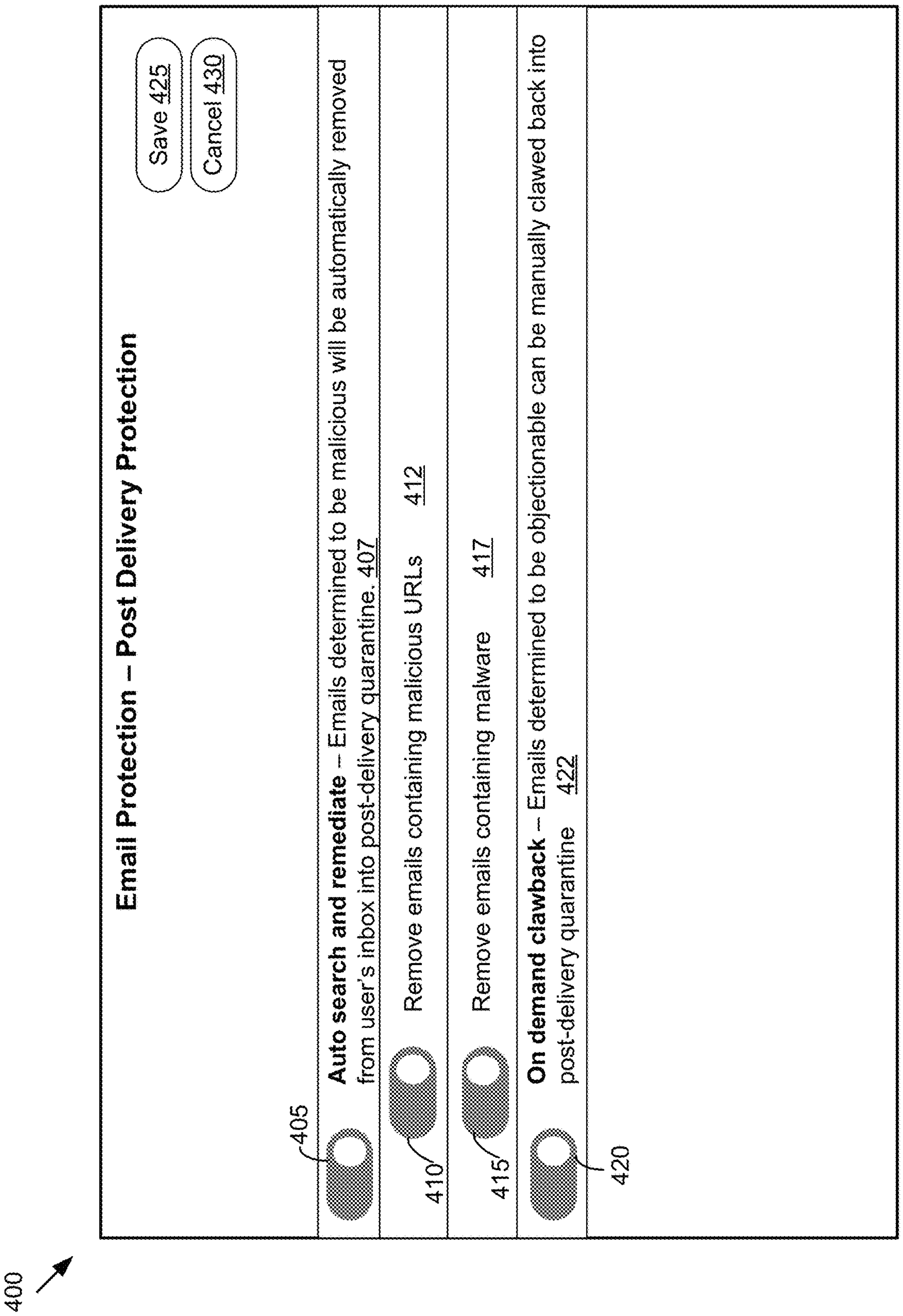
FIG. 4 is an example user interface of post-delivery protection options, according to some embodiments described herein.

FIG. 4 is an example user interface 400 of post-delivery protection options, according to some embodiments described herein. The user interface 400 includes a first button 405 for activating an automatic search and remediate option 407 where email messages that are determined to be malicious are automatically removed from a user's inbox and added to a post-delivery quarantine. The automatic search and remediate option 407 includes two subset categories where a user may select a second button 410 to activate a remove email messages containing Uniform Resource Locators (URLs) option 412 and a third button 415 to activate a remove email messages containing malware option 417.

The user interface 400 includes a fourth button 420 to activate an on demand clawback option 422 where email messages that are determined to include suspicious content or other problematic content are automatically clawed back (i.e., recalled) into post-delivery quarantine. In some embodiments, a user cannot request to recall one or more email messages unless the fourth button 420 for the on demand clawback option 422 is selected. In some embodiments, the fourth button 420 is automatically activated and a user deactivates the fourth button 420 if the user does not want the on demand clawback option 422 to be enabled. The user may select the save button 425 to accept the changes or the cancel button 430 to cancel the changes.

In some embodiments, the user interface module 315 generates a user interface with actions to perform on successfully recalled email messages. For example, the user interface may include options for deleting recalled email messages, sending recalled email messages to a quarantine, or modifying recalled email messages. The user interface module 315 may provide different options for modifying recalled email messages, such as adding a warning banner to a recalled email message, removing an attachment from a recalled email message, rewriting a recalled email message to modify an original URL to point to a URL protection service, etc.

The authentication module 320 determines whether a user authorized recall of email messages. In some embodiments, the authentication module 320 determines that the user is authorized based on the user activating a recall functionality, such as the fourth button 420 for activating the "On demand clawback" option 422 illustrated in FIG. 4.

The authentication module 320 determines that one or more domains associated with the one or more email servers 345 are enrolled with the security server 305. If the one or more domains are not associated with the one or more email servers 345, the user may add the one or more domains or configure the one or more domains to be connected using the options illustrated in FIG. 5.

Figure 5:
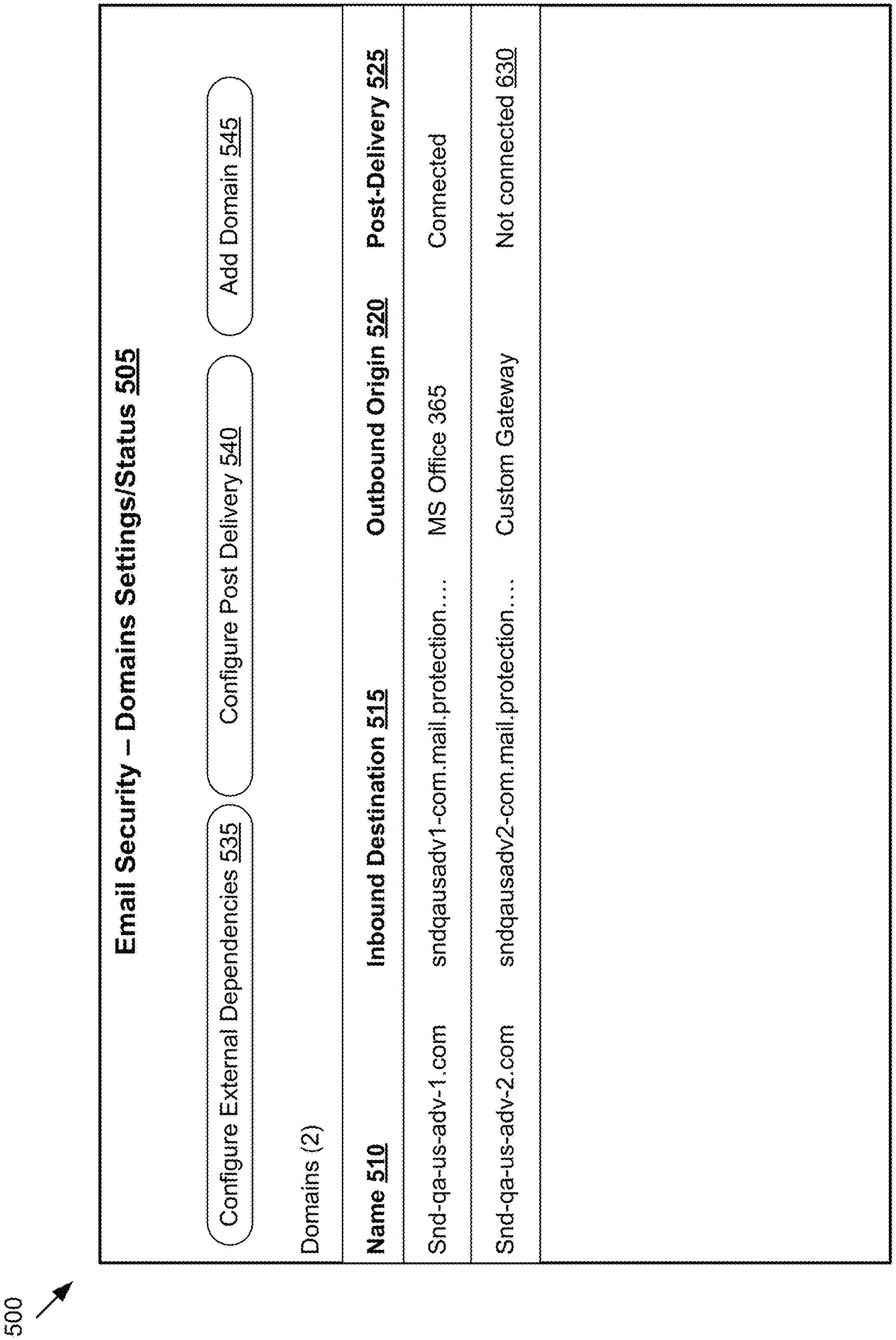
FIG. 5 is an example user interface of domain settings, according to some embodiments described herein.

FIG. 5 is an example user interface 500 of domain settings, according to some embodiments described herein. The user interface 500 includes a header identifying the domain settings 505 (e.g., "Email Security-Domain Settings/Status"). The user interface includes columns for identifying the email messages by a name 510, inbound destinations 515, an outbound origin 520, and a post-delivery status 525. In this example, the second domain is not connected 530. A user may fix the domain that is not connected 530 by selecting the configure external dependencies button 535. The configure post-delivery button 540 causes the user interface 500 to display a user interface with post-delivery options, such as the user interface 400 illustrated in FIG. 4. A user may add an additional domain by selecting the add domain button 545.

In some embodiments, the user interface module 315 does not display an option for a user to initiate clawback until the authentication module 320 determines that the user authorized recall of messages (e.g., that the user authorized the clawback option) and that one or more domains associated with one or more recipients are enrolled with the security server 305. For example, the user interface 600 illustrated in FIG. 6 may not include the initiate clawback button 620 until the authentication module 320 performs the previously-described authentication steps.

The risk assessment module 325 determines different types of risks that may trigger instructing the user interface module 315 to provide a recommendation to a user to recall one or more email messages.

In some embodiments, the risk assessment module 325 determines that one or more email messages that were delivered to or more recipients include suspicious content. The suspicious content may include a determination that a sender of the one or more email messages is associated with a compromised account, the sender of the one or more email messages is associated with a suspicious domain, the sender of the one or more email messages is associated with a suspicious Internet Protocol (IP) address, the one or more email messages are part of a phishing attack, the one or more email messages contain malware, the one or more email messages include a suspicious attachment, the one or more email messages include a URL that is identified as being associated with suspicious content, and/or that the one or more email messages are spam.

In some embodiments, the risk assessment module 325 receives a policy that defines one or more items selected from a group of Personally Identifiable Information (PII), sensitive information, confidential information, and/or prohibited content. The policy may be a new policy or updates to an old policy. For example, the risk assessment module 325 may receive new definitions of what constitutes prohibited content. In some embodiments, responsive to the risk assessment module 325 receiving an updated policy, the risk assessment module 325 rescans one or more email messages that were delivered to determine whether the one or more email messages violate the updated policy. All scans performed by the risk assessment module 325 are automatic, performed using pre-configured scanners; email messages of recipients are accessed in accordance with domain configurations that include implicit or explicit permission from all email users within that domain to perform such scans.

The risk assessment module 325 may determine that one or more email messages that were delivered to one or more recipients violate the policy. For example, a disgruntled employee of an organization may send an email with questionable content that violates the policy by defaming one of the other employees. Responsive to the risk assessment module 325 determining that the one or more email messages violate the policy, the risk assessment module 325 instructs the user interface module 315 to provide a suggestion to the user to initiate recall of the one or more email messages.

Figure 6:
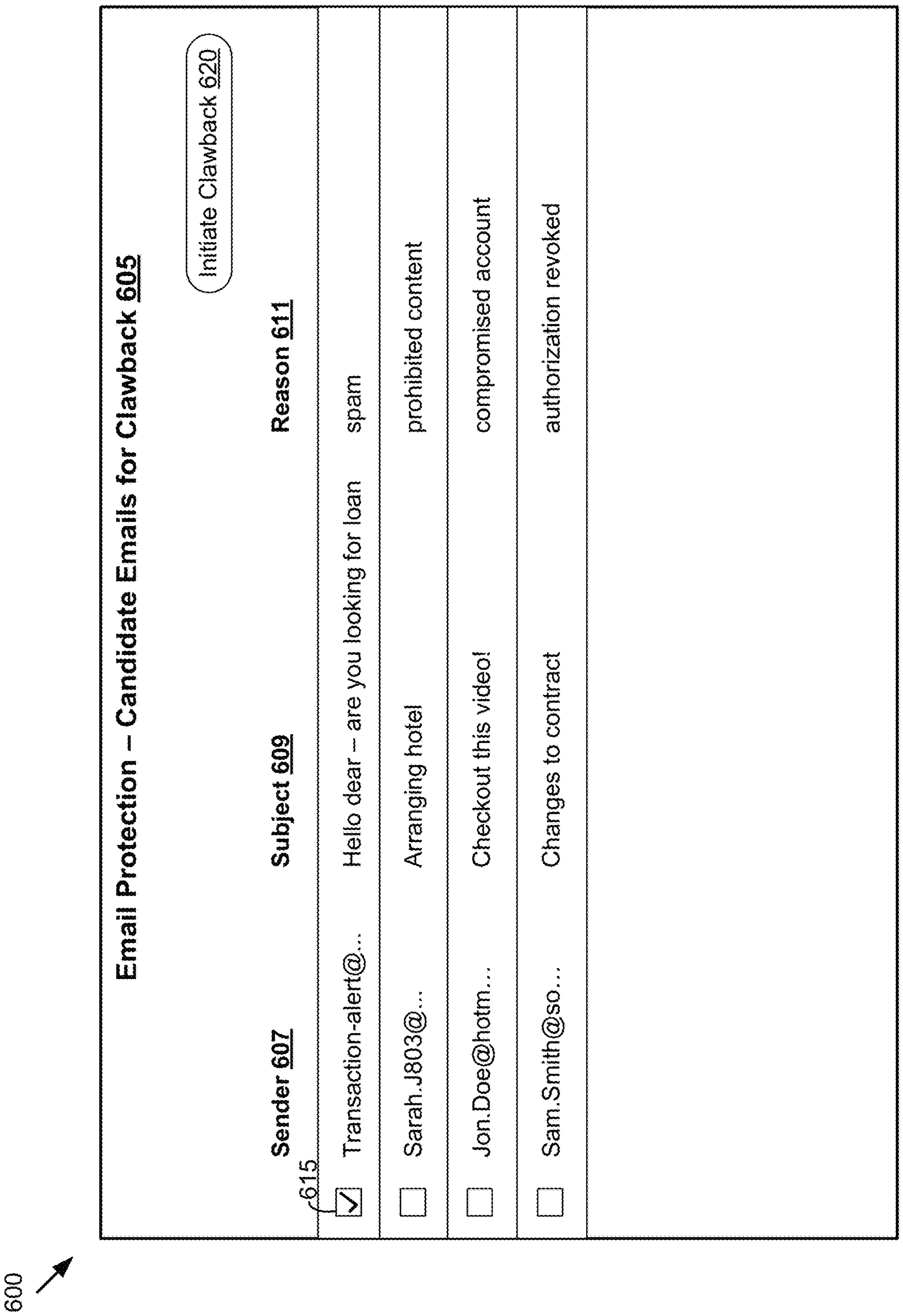
FIG. 6 is an example user interface to suggest that a user recall one or more messages, according to some embodiments described herein.

In some embodiments, the risk assessment module 325 determines that the one or more recipients are no longer authorized to view content in the one or more email messages. For example, the risk assessment module 325 may receive an updated list of one or more recipients that were recently terminated, one or more recipients that were recently demoted, one or more recipients with updated job titles, one or more recipients with changes in roles, etc. Responsive to determining that the one or more recipients are no longer authorized to view the content in the one or more email messages, the risk assessment module 325 instructs the user interface module 315 to provide a suggestion to the user to recall the one or more email messages. FIG. 6 includes one example of how the user interface could be configured.

FIG. 6 is an example user interface 600 to suggest that a user recall one or more messages, according to some embodiments described herein. The risk assessment module 325 may identify message identifiers that correspond to the email messages from the message history datastore 335. In some embodiments, the user interface module 315 retrieves metadata associated with the one or more email messages from the message history datastore 340, such as one or more sender names, one or more recipient names, a subject for each of the one or more email messages, a status for each of the one or more email messages, a delivery date for each of the one or more email messages, etc.

The user interface 600 includes a header identifying the candidate email messages for recall 605 (e.g., "Email Security-Candidate Emails for Clawback."). The user interface includes columns for identifying the email messages by a sender 607, a subject 609, and a reason 611. The reasons 611 are identified by the risk assessment module 325, such as because an email message was spam, included prohibited content, the sender was identified as being associated with a compromised account, or the recipient's authorization to view content in the email address was revoked. The user interface module 315 may display other columns as well, such as a recipient, a type of domain associated with an email message, a status of the email messages, a delivery date, etc.

A user selects a message for clawback by selecting a checkbox associated with each email message, such as checkbox 615, which selects the message in the row. Other selection options are possible, such as buttons, clickable buttons, etc. The user may select the initiate clawback button 620 to initiate clawback for the email messages that are selected with a checkmark, such as the first checkbox 615 with a positive selection (checkmark) in FIG. 6.

In some embodiments, instead of displaying a user interface that includes email messages that are identified by the risk assessment module 325 as being suggested for recall, the user interface module 315 generates a user interface that displays all the delivered email messages with an option for the user to manually select any of the delivered email messages for recall.

The orchestrator 330 performs searches of the message history datastore 335 and queries the message history datastore 335 for information that is used to create a command for an email server 340.

Figure 7:
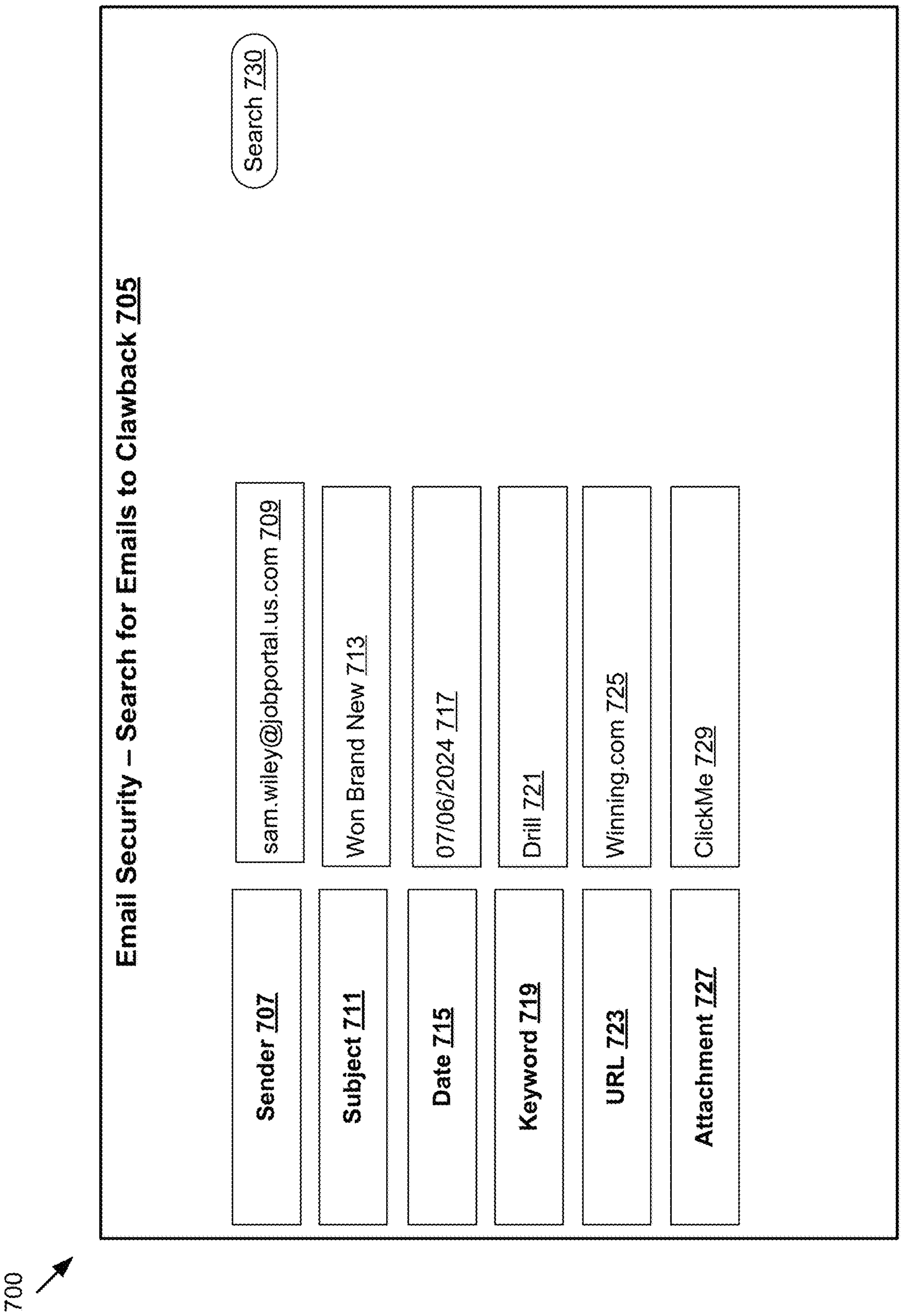
FIG. 7 is an example user interface that includes search criteria for recalling email messages, according to some embodiments described herein.

In some embodiments, the orchestrator 330 instructs the user interface module 315 to generate a user interface for searching for email messages that have been delivered to recipients. FIG. 7 is an example user interface 700 that includes search criteria for recalling email messages, according to some embodiments described herein. The user interface 700 includes a header identifying that the user interface is for searching for email messages for clawback 705.

The user interface 700 includes the following search criteria: sender 707, subject 711, date(s) 715, keyword 719, URL 723, and attachment 727. The user may enter text directly into a field. For example, "sam.wiley@jobportal.us.com" is added to the sender field 709, "Won Brand New" is added to the subject field 713, "Jul. 6, 2024" is added to the date field 717, "Drill" is added to the keyword field 721, "Winning.com" is added to the URL field 725, and "ClickMe" is added to the attachment field 729. The keyword field 721 may return results for any portion of an email address that matches the text input by the user. The text in the URL field 725 is used to search for email messages with attachments that match the text. The text in the attachment field 729 is used to search for email messages with attachments that match the text. The user may select the search button 730 once the relevant fields have been completed. Not all fields need to be completed, any one or more fields may be filled in.

The user interface 700 advantageously allows a user to recall multiple email messages at once. For example, the user may be an administrator that receives a notification from a recipient that an email message is a phishing attempt or that a seemingly legitimate sender has been impersonated. The administrator may identify email messages based on different search criteria and recall the email messages from hundreds of inboxes associated with hundreds of recipients.

In some embodiments, the orchestrator 330 receives a search request from a user, such as a search request with one or more of the search criteria illustrated in FIG. 7. The orchestrator 330 sends the search request to the message history datastore 340 and receives one or more message identifiers that correspond to the one or more email messages that match the search criteria in the search request. The orchestrator 330 may instruct the user interface module 315 to generate a user interface that includes the search results and a clawback button for requesting that one or more of the email messages be recalled.

Figure 8:
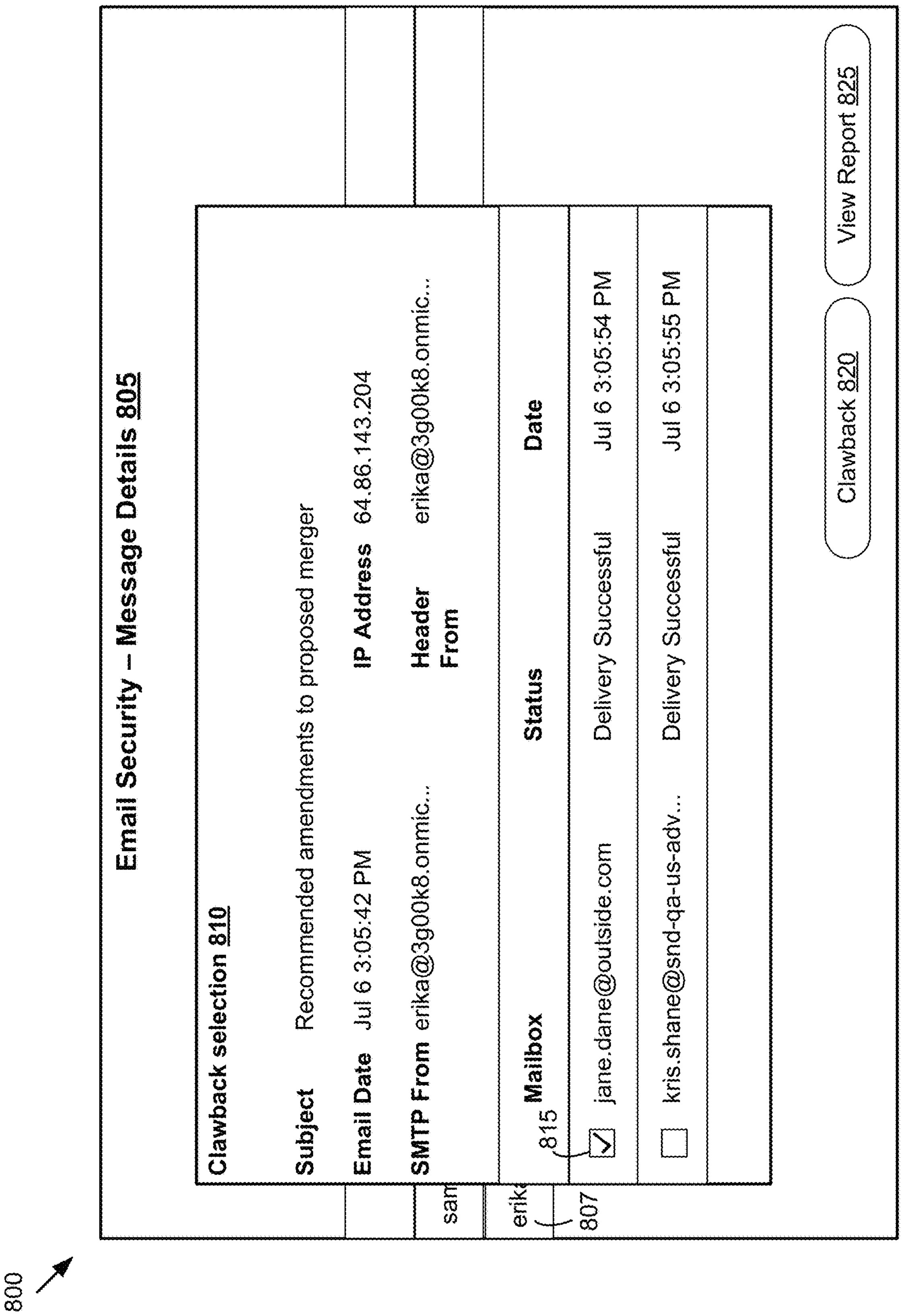
FIG. 8 is an example user interface for recalling an email message for one of the recipients, according to some embodiments described herein.

In some embodiments, a user may want to recall an email message from one of the recipients while not recalling the email message for one or more other recipients. For example, the user may determine that one of the recipients is outside of a company and should not receive the confidential information discussed in the email message. FIG. 8 is an example user interface 800 for recalling an email message for one of the recipients, according to some embodiments described herein.

The user interface 800 includes a header identifying message details for delivered email messages 805. The user interface 800 includes a list of email messages delivered to various recipients. A user may select one of the email messages to obtain additional details about the email message. In this example, selecting the second email 807 caused the clawback selection screen 810 to appear.

The clawback selection screen 810 includes an option for selecting one or two of the recipients. In this example, the user selected a checkbox 815 for the first recipient. The user may recall the email message from the first recipient by selecting the clawback button 820. The user may select the view report button 825 to display a summary report that describes whether the recall process was successful.

The orchestrator 330 receives a user request from a user to recall one or more email messages that were delivered to one or more recipients where the user request specifies one or more respective message identifiers for the one or more email messages. For example, the user may select a request an initiate clawback button (e.g., the initiate clawback button 620 in FIG. 6 or the clawback button 820 in FIG. 8). In some embodiments, the user request is based on selecting the one or more email messages from a list of search results.

The orchestrator 330 generates a command for an email server 345 to move the one or more email messages to a hidden directory 360 that is inaccessible to the one or more recipients. For example, the command may be selected from an Application Programming Interface (API) that is associated with the email server 345. The command includes the one or more respective message identifiers of the one or more email messages. When a recipient views their inbox, a recalled email message is no longer visible in the inbox. In some embodiments, the email server 345 deletes the recalled email message after it has been placed in the hidden directory. The orchestrator 330 deletes the recalled email message from the message history 340 after a predetermined number of days (e.g., 30 days).

The email server 345 includes an email application 350. The email application 350 receives the command from the orchestrator 330 to move the one or more email messages to a hidden directory. The email application 350 communicates with the email messages datastore 355 to fulfill the command. The email application 350 updates the orchestrator 330 about the status of the one or more email messages.

The orchestrator 330 determines a respective status for the one or more email messages. The respective status may include clawback successful, clawfack failed, clawback initiated, or clawback release.

The orchestrator 330 may determine the respective status based on a response from the email server 345. For example, the email server 345 may send an acknowledgement that an email message was successfully moved to the hidden directory, which corresponds to the clawback successful status.

In some embodiments, orchestrator 330 determines a respective status based on a nonresponse from the email server 345. For example, the email server 345 may experience a temporary connection issue that prevents the email server 345 from receiving the command or responding to the command. In some embodiments, the orchestrator 330 resends the command a predetermined number of times (e.g., three times) before marking the attempt as a clawback failure. While the orchestrator 330 is waiting for a response from the email server 345, the status may be identified as a clawback initiated. If the email server 345 does not send a response after the predetermined number of tries are made, the orchestrator 330 determines that the status is a clawback failure. In some embodiments, the email server 345 indicates that the message or mailbox no longer exists and the orchestrator 330 determines that the status is a clawback failure.

The orchestrator 330 instructs the user interface module 315 to provide a summary report to the user that indicates the respective status of the one or more email messages.

In some embodiments, the quarantine module 335 manages a post-delivery quarantine of recalled messages by adding the recalled messages to a quarantine folder. In some embodiments, the quarantine folder is stored in the message history datastore 340 on the security server 305. The quarantine module 335 may instruct the user interface module 315 to display a list of the recalled messages that are in the quarantine folder.

In some embodiments, the user may request that one or more of the recalled messages are released from the quarantine folder. The quarantine module 335 releases the one or more email messages from the quarantine folder, commands the email server 345 to move the one or more email messages from the hidden directory to the inbox, and updates the status of the one or more email messages to be clawback release.

In some embodiments, the quarantine module 335 sends a modification command to the email server 335 to modify the one or more email messages by performing an action. The action may include adding a warning banner, removing an attachment from the one or more email messages, and/or rewriting the one or more email messages to modify an original URL to point to a URL protection service. The quarantine module 335 may generate an command to the email server 345 to redeliver the modified email message.

Example Method

FIG. 9 is a flow diagram of an example method 900 to recall an email message, according to some embodiments described herein. The method 900 may be performed by a security application, such as the security application 103 in FIG. 1, 2, or 3.

The method 900 may begin at block 902. At block 902, a user is determined to be authorized to recall one or more email messages. Block 902 may be followed by block 904.

At block 904, one or more domains that are associated with the one or more recipients of the one or more email messages are determined to be enrolled with a security server. Block 904 may be followed by block 906.

At block 906, responsive to determining that the user authorized recall of the one or more email messages and that the one or more domains are enrolled with the security server, a user request is received from a user to recall the one or more email messages that were delivered to one or more recipients, the user request specifying one or more respective message identifiers for the one or more email messages.

In some embodiments, the user request is prompted by a search of email messages that match a search request based on one or more search criteria where responsive to sending the search request, one or more message identifiers that correspond to the one or more email messages that match the one or more search criteria in the search request are received and the one or more respective message identifiers that correspond to the one or more email messages.

In some embodiments, the user request is prompted by a recommendation by the security application 103 to recall the one or more email messages. For example, the method 900 may include determining that the one or more email messages that were delivered to the one or more recipients include suspicious content and responsive to determining that the one or more email messages include suspicious content, providing a suggestion to the user to initiate recall of the one or more email messages. Determining that the one or more email messages include suspicious content may be based on at least one determination selected from a group comprising: a sender of the one or more email messages is associated with a compromised account, the sender of the one or more email messages is associated with a suspicious domain, the sender of the one or more email messages is associated with a suspicious Internet Protocol (IP) address, the one or more email messages are part of a phishing attack, the one or more email messages contain malware, the one or more email messages include a suspicious attachment, the one or more email messages include a Uniform Resource Locator (URL) associated with suspicious content, the one or more email messages are spam, and combinations thereof.

In some embodiments, the method 900 further includes receiving a policy that defines one or more items selected from a group of Personally Identifiable Information (PII), sensitive information, confidential information, prohibited content, and combinations thereof; prior to receiving the request from the user to recall the one or more email messages, determining that the one or more email messages that were delivered to the one or more recipients violate the policy; and responsive to determining that the one or more email messages violate the policy, providing a suggestion to the user to initiate recall of the one or more email messages.

In some embodiments, the method 900 further includes prior to receiving the user request from the user to recall the one or more email messages: providing a user interface that includes a search function that enables searching email messages received at the email server of the one or more domains based on one or more options selected from a group of a sender, a recipient, a keyword, a Uniform Resource Locator, a name of an attachment, and the one or more email messages that include an executable, and combinations thereof; performing the search based on user input received via the user interface, wherein the user input specifies respective field values for the one or more fields, to identify the one or more email messages that were delivered to the one or more recipients; and providing an updated user interface to the user that enables the user to initiate recall of the one or more email messages. The search may include a list of recipients of the one or more email messages to recall the message from, wherein the list of recipients excludes at least one of the one or more recipients.

In some embodiments, the method 900 further includes prior to receiving the user request from the user to recall the one or more email messages: determining that the one or more recipients are no longer authorized to view content in the one or more email messages; and responsive to determining that the one or more recipients are no longer authorized to view the content in the one or more email messages, providing a suggestion to the user to recall the one or more email messages.

In some embodiments, the one or more email messages are associated with a plurality of recipients and the method 900 further includes prior to receiving the request from the user to recall the one or more email messages, receiving a notification from at least one of the plurality of recipients that the one or more email messages contain suspicious content; and responsive to receiving the notification from at least one of the plurality of recipients, providing a suggestion to the user to recall the one or more email messages. Block 906 may be followed by block 908.

At block 908, a command is provided to an email server of the one or more domains to move the one or more email messages to a hidden directory that is inaccessible to the one or more recipients, where the commands include the one or more respective message identifiers of the one or more email messages. Block 908 may be followed by block 910.

At block 910, a respective status for the one or more email messages is determined based on a response or a nonresponse from the email server, where the respective status is one of: clawback successful, clawback failed, or clawback initiated.

In some embodiments, the method 900 further includes sending a modification command to the email server to modify the one or more email messages by performing an action selected from a group of adding a warning banner, removing an attachment from the one or more email messages, rewriting the one or more email messages to modify an original Uniform Resource Locator (URL) to point to a URL protection service, and combinations thereof. In some embodiments, the method 900 further includes adding the one or more email messages to a quarantine folder; responsive to receiving a release request, releasing the one or more email messages from the quarantine folder; and updating the respective status of the one or more messages to clawback release. Block 910 may be followed by block 912.

At block 912, responsive to determining the respective status, providing a summary report to the user that indicates the respective status of the one or more email messages.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:

determining that a user activated recall functionality of one or more email messages;

determining that one or more domains associated with one or more recipients of the one or more email messages are enrolled with a security server;

providing a user interface that includes a search function that enables searching email messages received at an email server of the one or more domains;

performing a search based on user input received via the user interface to identify the one or more email messages that were delivered to the one or more recipients;

providing an updated user interface that includes a button to initiate recall of the one or more email messages;

responsive to a selection of the button, receiving a user request to recall the one or more email messages that were delivered to the one or more recipients, the user request specifying one or more respective message identifiers for the one or more email messages;

providing a command to the email server of the one or more domains to move the one or more email messages to a hidden directory that is inaccessible to the one or more recipients, wherein the command includes the one or more respective message identifiers of the one or more email messages;

determining a respective status for the one or more email messages based on a response or a nonresponse from the email server, wherein the respective status is one of: clawback successful, clawback failed, or clawback initiated; and responsive to determining the respective status, providing a summary report to the user that indicates the respective status of the one or more email messages.

2. The method of claim 1, further comprising:

prior to providing the command to the email server to move the one or more email messages, querying a message history database for the one or more email messages that match a search request based on one or more search criteria; and responsive to querying the message history database, receiving the one or more respective message identifiers that correspond to one or more email messages that match the one or more search criteria in the search request.

3. The method of claim 1, further comprising:

prior to receiving the user request to recall the one or more email messages, determining that the one or more email messages that were delivered to the one or more recipients include suspicious content; and responsive to determining that the one or more email messages include suspicious content, providing a suggestion to the user to initiate recall of the one or more email messages.

4. The method of claim 3, wherein determining that the one or more email messages include suspicious content is based on at least one determination selected from a group comprising: a sender of the one or more email messages is associated with a compromised account, the sender of the one or more email messages is associated with a suspicious domain, the sender of the one or more email messages is associated with a suspicious Internet Protocol (IP) address, the one or more email messages are part of a phishing attack, the one or more email messages contain malware, the one or more email messages include a suspicious attachment, the one or more email messages include a Uniform Resource Locator (URL) associated with suspicious content, the one or more email messages are spam, and combinations thereof.

5. The method of claim 1, further comprising:

receiving a policy that defines one or more items selected from a group of Personally Identifiable Information (PII), sensitive information, confidential information, prohibited content, and combinations thereof;

prior to receiving the user request to recall the one or more email messages, determining that the one or more email messages that were delivered to the one or more recipients violate the policy; and responsive to determining that the one or more email messages violate the policy, providing a suggestion to the user to initiate recall of the one or more email messages.

6. The method of claim 1, wherein the search function that enables searching email messages received at the email server of the one or more domains is based on one or more options selected from a group of a sender, a recipient, a keyword, a Uniform Resource Locator, a name of an attachment, and the one or more email messages that include an executable, and combinations thereof; and wherein the user input specifies respective field values for one or more fields, to identify the one or more email messages that were delivered to the one or more recipients.

7. The method of claim 1, wherein the updated user interface includes a list of recipients of the one or more email messages to recall the one or more email messages from, wherein the list of recipients excludes at least one of the one or more recipients.

8. The method of claim 1, further comprising, prior to receiving the user request to recall the one or more email messages:

determining that the one or more recipients are no longer authorized to view content in the one or more email messages; and responsive to determining that the one or more recipients are no longer authorized to view the content in the one or more email messages, providing a suggestion to the user to recall the one or more email messages.

9. The method of claim 1, wherein the one or more email messages are associated with a plurality of recipients, the method further comprising:

prior to receiving the user request to recall the one or more email messages, receiving a notification from at least one of the plurality of recipients that the one or more email messages contain suspicious content; and responsive to receiving the notification from at least one of the plurality of recipients, providing a suggestion to the user to recall the one or more email messages.

10. The method of claim 1, further comprising:

sending a modification command to the email server to modify the one or more email messages by performing an action selected from a group of adding a warning banner, removing an attachment from the one or more email messages, rewriting the one or more email messages to modify an original Uniform Resource Locator (URL) to point to a URL protection service, and combinations thereof.

11. The method of claim 1, further comprising:

adding the one or more email messages to a quarantine folder;

responsive to receiving a release request, releasing the one or more email messages from the quarantine folder; and updating the respective status of the one or more email messages to clawback release.

12. A system comprising:

one or more processors; and one or more computer-readable media, having instructions stored thereon that, when executed by the one or more processors, cause the one or more processors to perform operations comprising:

determining that a user activated recall functionality of one or more email messages;

determining that one or more domains associated with one or more recipients of the one or more email messages are enrolled with a security server;

providing a user interface that includes a search function that enables searching email messages received at an email server of the one or more domains;

performing a search based on user input received via the user interface to identify the one or more email messages that were delivered to the one or more recipients;

providing an updated user interface that includes a button to initiate recall of the one or more email messages;

responsive to a selection of the button, receiving a user request to recall the one or more email messages that were delivered to the one or more recipients, the user request specifying one or more respective message identifiers for the one or more email messages;

providing a command to the email server of the one or more domains to move the one or more email messages to a hidden directory that is inaccessible to the one or more recipients, wherein the command includes the one or more respective message identifiers of the one or more email messages;

determining a respective status for the one or more email messages based on a response or a nonresponse from the email server, wherein the respective status is one of: clawback successful, clawback failed, or clawback initiated; and responsive to determining the respective status, providing a summary report to the user that indicates the respective status of the one or more email messages.

13. The system of claim 12, wherein the operations further include:

prior to providing the command to the email server to move the one or more email messages, querying a message history database for the one or more email messages that match a search request based on one or more search criteria; and responsive to querying the message history database, receiving the one or more respective message identifiers that correspond to one or more email messages that match the one or more search criteria in the search request.

14. The system of claim 12, wherein the operations further include:

prior to receiving the user request to recall the one or more email messages, determining that the one or more email messages that were delivered to the one or more recipients include suspicious content; and responsive to determining that the one or more email messages include suspicious content, providing a suggestion to the user to initiate recall of the one or more email messages.

15. The system of claim 14, wherein determining that the one or more email messages include suspicious content is based on at least one determination selected from a group comprising: a sender of the one or more email messages is associated with a compromised account, the sender of the one or more email messages is associated with a suspicious domain, the sender of the one or more email messages is associated with a suspicious Internet Protocol (IP) address, the one or more email messages are part of a phishing attack, the one or more email messages contain malware, the one or more email messages include a suspicious attachment, the one or more email messages include a Uniform Resource Locator (URL) associated with suspicious content, the one or more email messages are spam, and combinations thereof.

16. A non-transitory computer-readable medium with instructions stored thereon that, responsive to execution by one or more processing devices, cause the one or more processing devices to perform operations comprising:

determining that a user activated recall functionality of one or more email messages;

determining that one or more domains associated with one or more recipients of the one or more email messages are enrolled with a security server;

providing a user interface that includes a search function that enables searching email messages received at an email server of the one or more domains;

performing a search based on user input received via the user interface to identify the one or more email messages that were delivered to the one or more recipients;

providing an updated user interface that includes a button to initiate recall of the one or more email messages;

responsive to a selection of the button, receiving a user request to recall the one or more email messages that were delivered to the one or more recipients, the user request specifying one or more respective message identifiers for the one or more email messages;

providing a command to the email server of the one or more domains to move the one or more email messages to a hidden directory that is inaccessible to the one or more recipients, wherein the command includes the one or more respective message identifiers of the one or more email messages;

determining a respective status for the one or more email messages based on a response or a nonresponse from the email server, wherein the respective status is one of: clawback successful, clawback failed, or clawback initiated; and responsive to determining the respective status, providing a summary report to the user that indicates the respective status of the one or more email messages.

17. The computer-readable medium of claim 16, wherein the operations further include:

prior to providing the command to the email server to move the one or more email messages, querying a message history database for the one or more email messages that match a search request based on one or more search criteria; and responsive to querying the message history database, receiving the one or more respective message identifiers that correspond to one or more email messages that match the one or more search criteria in the search request.

18. The computer-readable medium of claim 16, wherein the operations further include:

prior to receiving the user request to recall the one or more email messages, determining that the one or more email messages that were delivered to the one or more recipients include suspicious content; and responsive to determining that the one or more email messages include suspicious content, providing a suggestion to the user to initiate recall of the one or more email messages.

19. The computer-readable medium of claim 18, wherein determining that the one or more email messages include suspicious content is based on at least one determination selected from a group comprising: a sender of the one or more email messages is associated with a compromised account, the sender of the one or more email messages is associated with a suspicious domain, the sender of the one or more email messages is associated with a suspicious Internet Protocol (IP) address, the one or more email messages are part of a phishing attack, the one or more email messages contain malware, the one or more email messages include a suspicious attachment, the one or more email messages include a Uniform Resource Locator (URL) associated with suspicious content, the one or more email messages are spam, and combinations thereof.

20. The computer-readable medium of claim 16, wherein the operations further include:

receiving a policy that defines one or more items selected from a group of Personally Identifiable Information (PII), sensitive information, confidential information, prohibited content, and combinations thereof;

prior to receiving the user request to recall the one or more email messages, determining that the one or more email messages that were delivered to the one or more recipients violate the policy; and responsive to determining that the one or more email messages violate the policy, providing a suggestion to the user to initiate recall of the one or more email messages.

* * * * *